US009512944B1

(12) United States Patent
Buzdum et al.

(10) Patent No.: US 9,512,944 B1
(45) Date of Patent: Dec. 6, 2016

(54) FLANGE CLAMP WITH AN AUTOMATIC FAIL SAFE

(71) Applicants: Mirko Buzdum, Watertown, WI (US); Jonathan Peter Wade, Milwaukee, WI (US)

(72) Inventors: Mirko Buzdum, Watertown, WI (US); Jonathan Peter Wade, Milwaukee, WI (US)

( * ) Notice: Subject to any disclaimer, the term of this patent is extended or adjusted under 35 U.S.C. 154(b) by 90 days.

(21) Appl. No.: 14/705,014

(22) Filed: May 6, 2015

(51) Int. Cl.
*F16L 21/06* (2006.01)
*F16L 23/04* (2006.01)
*F16L 37/127* (2006.01)

(52) U.S. Cl.
CPC .............. *F16L 21/06* (2013.01); *F16L 23/04* (2013.01); *F16L 37/127* (2013.01)

(58) Field of Classification Search
CPC .......... F16L 23/10; F16L 23/06; F16L 23/08
USPC ...................... 285/84, 91, 409, 365
See application file for complete search history.

(56) References Cited

U.S. PATENT DOCUMENTS

| 1,646,463 | A | * | 10/1927 | Stokesberry | F16L 23/06 285/409 |
| 2,706,648 | A | * | 4/1955 | Gosse | F16L 23/06 285/409 |
| 2,775,806 | A | * | 1/1957 | Love | F16L 23/06 285/411 |
| 3,042,430 | A | * | 7/1962 | Guy | F16L 23/06 285/365 |
| 3,157,932 | A | * | 11/1964 | Kyrias | F16L 33/12 285/365 |
| 3,705,737 | A | * | 12/1972 | Westerlund | F16L 23/06 285/365 |
| 3,967,837 | A | * | 7/1976 | Westerlund | F16L 23/06 285/365 |
| 4,008,937 | A | | 2/1977 | Filippi | |
| 4,643,460 | A | * | 2/1987 | Lieberg | F16L 23/06 285/365 |
| 4,660,869 | A | * | 4/1987 | Gabus | F16L 23/04 285/365 |
| 5,597,184 | A | * | 1/1997 | Brenes | F16L 23/06 285/365 |
| 5,988,694 | A | * | 11/1999 | Brushaber | F16L 23/06 285/365 |
| 8,201,852 | B2 | * | 6/2012 | Linhorst | F16L 23/06 285/365 |
| 2007/0234568 | A1 | * | 10/2007 | Knoblauch | F16L 23/06 29/890.14 |
| 2009/0194994 | A1 | * | 8/2009 | Weinhold | F16L 23/06 285/365 |
| 2010/0038903 | A1 | * | 2/2010 | Linhorst | F16L 33/12 285/365 |
| 2010/0320758 | A1 | | 12/2010 | Sisk | |
| 2011/0101687 | A1 | | 5/2011 | Heelan, Jr. et al. | |

* cited by examiner

*Primary Examiner* — David E Bochna
(74) *Attorney, Agent, or Firm* — Donald J. Ersler

(57) ABSTRACT

A flange clamp with an automatic fail safe preferably includes a first clamp half, a second clamp half, a lock lever, a hook member and a quick release pull pin. One end of the first clamp half is pivotally attached to one end of the second clamp half. A hook opening is formed on an opposing end of the first clamp half. The lock lever is pivotally retained on an opposing end of the second clamp half. The hook member includes a hook rod and a pivot block. The hook rod is threadably retained in the pivot block. The pivot block is pivotally retained by the lock lever. A mounting plate is attached to an outer surface of the second clamp half. The quick release pull pin is slidably retained in the mounting plate.

18 Claims, 3 Drawing Sheets

FLANGE CLAMP WITH AN AUTOMATIC FAIL SAFE

BACKGROUND OF THE INVENTION

1. Field of the Invention

The present invention relates generally to joining pipes and more specifically to a flange clamp with an automatic fail safe, which locks a lock lever of the flange clamp once the lock lever is fully clamped.

2. Discussion of the Prior Art

Patent no. 4008937 TO Filippi discloses a coupling assembly. Patent publication no. 2010/0320758 to Sisk discloses a pipe coupler with split gasket and gripping clips. Patent publication no. 2011/0101687 to Heelan Jr. et al. discloses a coupling.

Accordingly, there is a clearly felt need in the art for a flange clamp with an automatic fail safe, which automatically locks a lock lever of the flange clamp once the lock lever is fully clamped and requires a positive action on the part of an operator to unlock the flange clamp.

SUMMARY OF THE INVENTION

The present invention provides a flange clamp with an automatic fail safe, which requires a positive action on the part of an operator to unlock the flange clamp. The flange clamp with an automatic fail safe (flange clamp) preferably includes a first clamp half, a second clamp half, a lock lever, a hook member and a quick release pull pin. The first and second clamp halves include a substantially semi-circular shape and a V-shaped cross section. A pivot flange is formed on one end of the first clamp half and a hook opening is formed through an opposing end of the first clamp half. A pivot yoke is formed on one end of the second clamp half to receive the pivot flange of the first clamp half. The pivot yoke is pivotally secured to the pivot flange with a rivet or the like. A lever yoke is formed on an opposing end of the second clamp half. The lock lever has a U-shape. An open end of the lever yoke is pivotally retained in the lever yoke with a rivet or the like. The hook member includes a hook rod and a pivot block. A threaded shaft is formed on one end of the hook rod and a hook is formed on an opposing end thereof. The pivot block includes a threaded hole for threadably receiving the threaded shaft. The pivot block is pivotally retained in the lock lever at substantially an open end thereof. A mounting plate is attached to an outer surface of the second clamp half. A nut thread is formed through the mounting plate to threadably receive the quick release pull pin. The quick release pull pin automatically locks the lock lever, when the lock lever fully clamps two pipe flanges. The quick release pull pin also requires an operator to retract the quick release pull pin to release the lock lever and open the flange clamp. The quick release pull pin may be purchased from numerous manufacturers as a complete part.

Accordingly, it is an object of the present invention to provide a flange clamp with an automatic fail safe, which locks a lock lever of the flange clamp once the lock lever is fully clamped.

Finally, it is another object of the present invention to provide a flange clamp with an automatic fail safe, which requires a positive action on the part of an operator to unlock the flange clamp.

These and additional objects, advantages, features and benefits of the present invention will become apparent from the following specification.

DETAILED DESCRIPTION OF THE PREFERRED EMBODIMENTS

Figure 1:
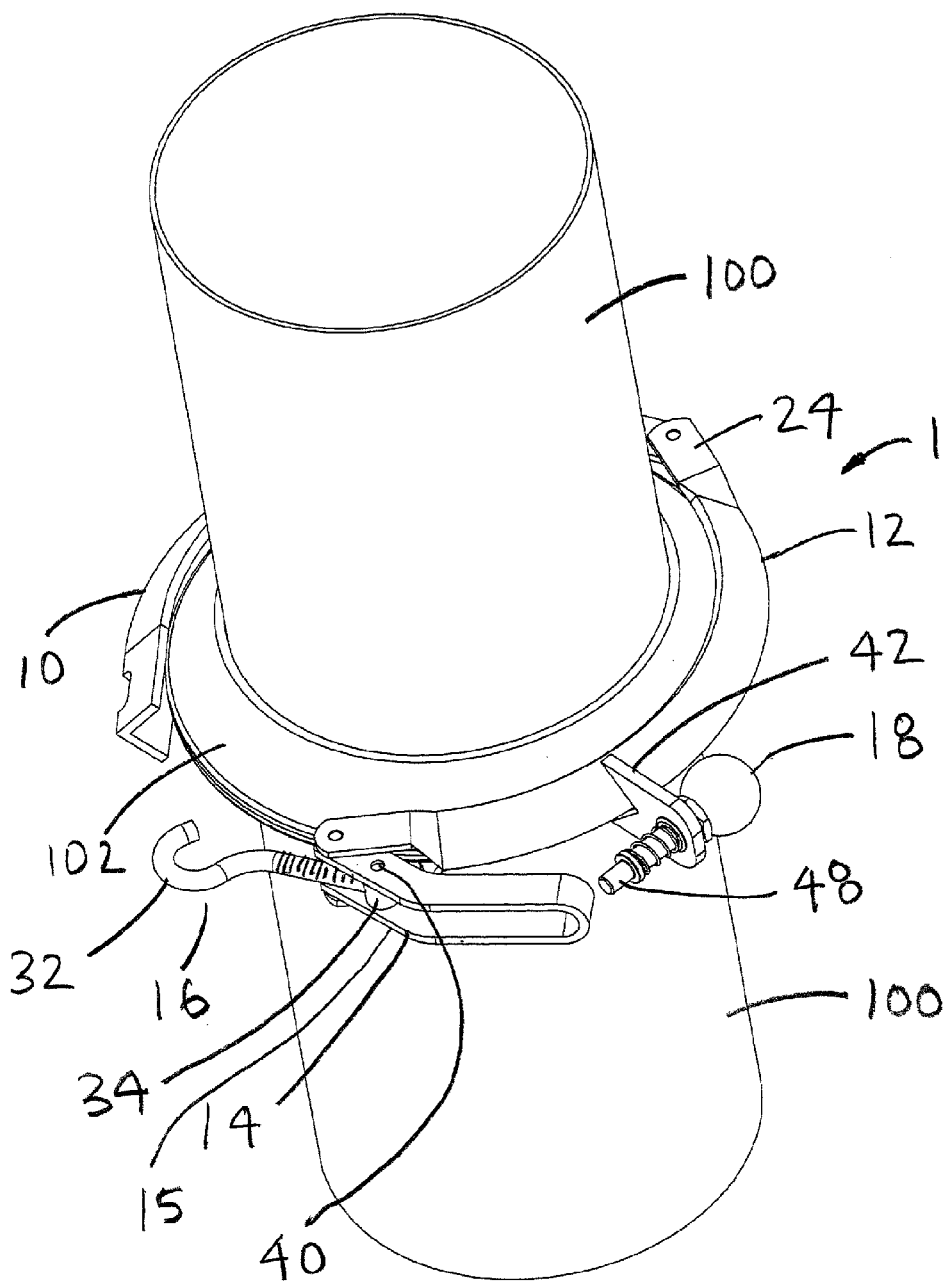
FIG. 1 is a perspective view of a flange clamp retained on two flanges of two adjacent flanged pipes, before locking the flange clamp on the two flanges in accordance with the present invention.
Figure 2:
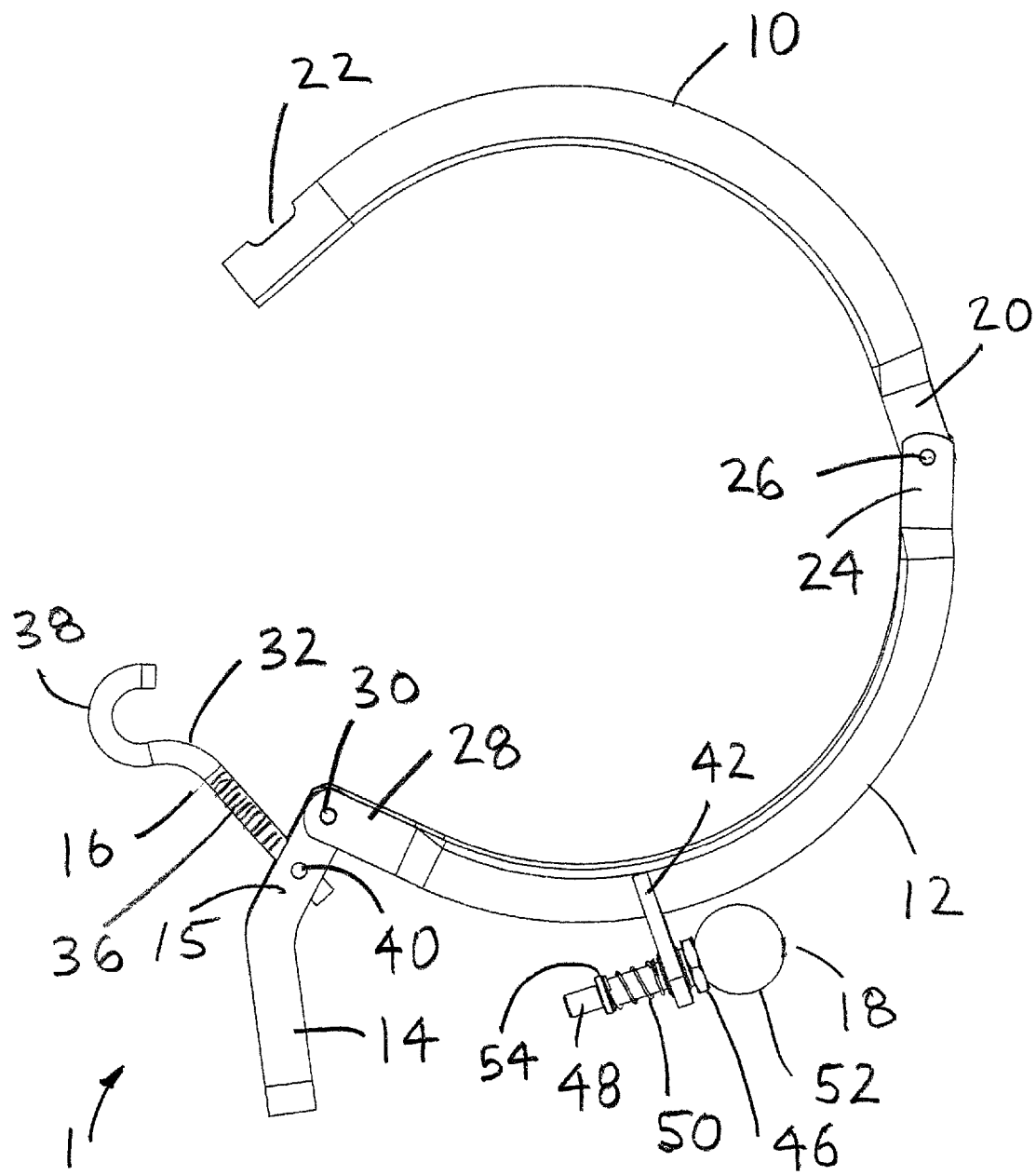
FIG. 2 is a top view of an open flange clamp in accordance with the present invention.
Figure 3:
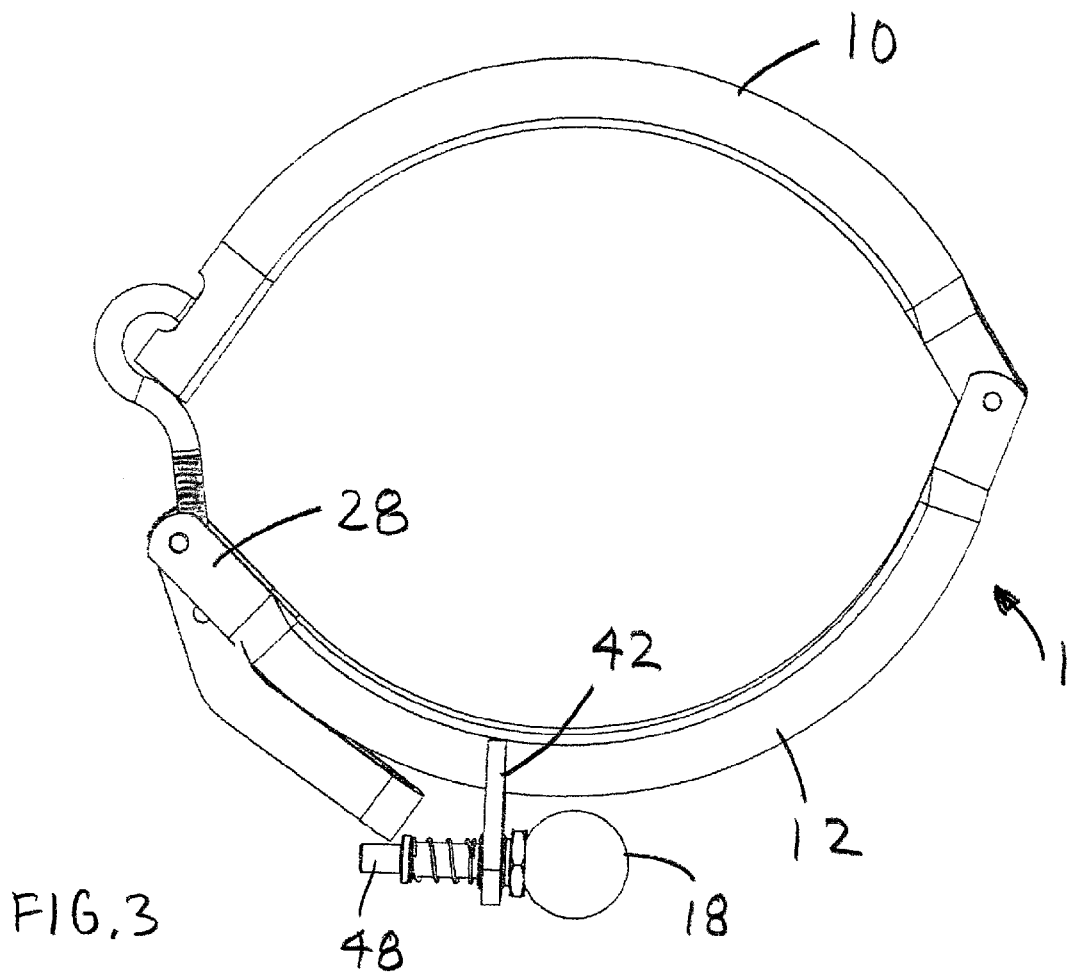
FIG. 3 is a front view of a flange clamp in a closed orientation in accordance with the present invention.
Figure 4:
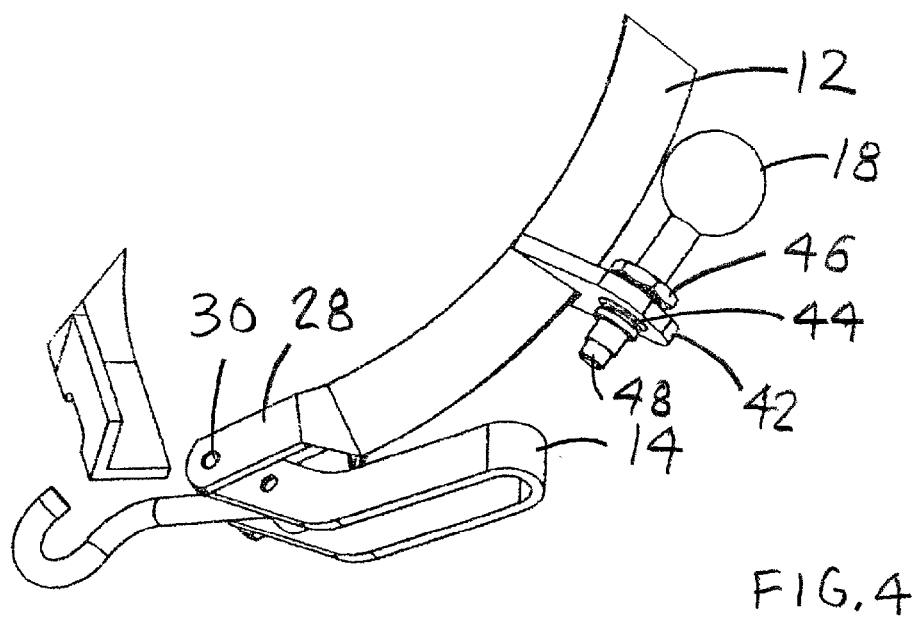
FIG. 4 is a partial perspective view of flange clamp in an open orientation in accordance with the present invention.

With reference now to the drawings, and particularly to FIG. 1, there is shown a perspective view of a flange clamp 1 retained on two flanges 102 of two adjacent flanged pipes 100. With reference to FIGS. 2-4, the flange clamp 1 preferably includes a first clamp half 10, a second clamp half 12, a lock lever 14, a hook member 16 and a quick release pull pin 18. The first and second clamp halves 10, 12 include a substantially semi-circular shape and a V-shaped cross section to retain two adjacent flanges 102. A pivot flange 20 is formed on one end of the first clamp half 10 and a hook opening 22 is formed through an opposing end of the first clamp half 10. A pivot yoke 24 is formed on one end of the second clamp half 12 to receive a thickness of the pivot flange 20 of the first clamp half 10. The pivot flange 20 is pivotally secured in the pivot yoke 24 with a rivet 26 or the like.

A lever yoke 28 is formed on an opposing end of the second clamp half 12. The lock lever 14 has a U-shape with two angled legs 15. The two angled legs 15 are pivotally retained in the lever yoke 28 with a rivet 30 or the like. The hook member 16 includes a hook rod 32 and a pivot block 34. A threaded shaft 36 is formed on one end of the hook rod 32 and a hook 38 is formed on an opposing end thereof. The pivot block 34 includes a threaded hole for threadably receiving the threaded shaft 36. The pivot block 34 is pivotally retained between the two angled legs 15 with a pair of rivets 40 or the like. A mounting plate 42 is attached to an outer surface of the second clamp half 12 with welding or the like. A nut thread 44 is formed through the mounting plate 42 to threadably receive a threaded nut 46 of the quick release pull pin 18. The quick release pull pin 18 preferably includes the threaded nut 46, a retention pin 48, a spring 50 and a pull knob 52. The retention pin 48 includes a spring flange 54 to retain the spring 50. The spring 50 is retained on the retention pin 48. The retention pin 48 is inserted into the threaded nut 46. The retention pin 48 is threaded into the pull knob 52.

The quick release pull pin 18 automatically locks the lock lever 14, when the lock lever 14 fully clamps the two pipe flanges 102. The quick release pull pin 18 also requires an operator to retract the retention pin 48 to release the lock lever 14 and open the flange clamp 1. The quick release pull pin 18 may be purchased from numerous manufacturers as a complete assembly.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. A flange clamp with an automatic fail safe comprising:
a first clamp half having one end and an opposing end, said first clamp half having a substantially semi-circular shape, a hook opening is located on said opposing end;
a second clamp half having one end and an opposing end, said second clamp half having a substantially semi-circular shape, said one end of said first clamp half being pivotally attached to said one end of said second clamp half;
a lock lever having one end pivotally retained by said opposing end of said second clamp half;
a hook member includes a hook rod and a pivot block, said hook rod includes a hook portion and a threaded shaft, said threaded shaft is threadably retained in said pivot block, said pivot block is pivotally retained by said lock lever; and
a quick release pull pin includes a retention pin and a spring, a lengthwise axis of said retention pin is slidably retained on said second clamp half in a locked position and an unlocked position, said retention pin is biased into said locked orientation with said spring, wherein said first and second clamp halves are capable of being secured to flanges of two adjacent pipes, said hook portion is inserted into said hook opening, a distal end of said lock lever is retained by said retention pin of said quick release pull pin in said locked orientation when closed.

2. The flange clamp with an automatic fail safe of claim 1 wherein:
said lock lever includes a U-shape, said U-shape includes an open end.

3. The flange clamp with an automatic fail safe of claim 2 wherein:
two angled legs extend from said open end.

4. The flange clamp with an automatic fail safe of claim 1 wherein:
said first and second clamp halves include a V-shaped cross section.

5. The flange clamp with an automatic fail safe of claim 1 wherein:
a pivot flange is formed on said one end of said first clamp half, a pivot yoke is formed on said one end of said second clamp half to receive a thickness of said pivot flange.

6. The flange clamp with an automatic fail safe of claim 1 wherein:
a lever yoke is formed on said opposing end of said second clamp half.

7. A flange clamp with an automatic fail safe comprising:
a first clamp half having one end and an opposing end, said first clamp half having a substantially semi-circular shape, a hook opening is located on said opposing end;
a second clamp half having one end and an opposing end, said second clamp half having a substantially semi-circular shape, said one end of said first clamp half being pivotally attached to said one end of said second clamp half;
a lock lever having one end pivotally retained by said opposing end of said second clamp half;
a hook member includes a hook rod and a pivot block, said hook rod includes a hook portion and a threaded shaft, said threaded shaft is threadably retained by said pivot block, said pivot block is pivotally retained by said lock lever;
a mounting plate extends from said second clamp half; and
a quick release pull pin is retained by said mounting plate, said quick release pin includes a retention pin and a spring, a lengthwise axis of said retention pin is slidably retained in said mounting plate in a locked position and an unlocked position, said retention pin is biased into said locked orientation with said spring, said lengthwise axis is substantially parallel to a side wall of said second clamp half, wherein said first and second clamp halves are capable of being secured to flanges of two adjacent pipes, said hook portion is inserted into said hook opening, a distal end of said lock lever is retained by said retention pin of said quick release pull pin in said locked orientation when closed.

8. The flange clamp with an automatic fail safe of claim 7 wherein:
said lock lever includes a U-shape, said U-shape includes an open end.

9. The flange clamp with an automatic fail safe of claim 8 wherein:
two angled legs extend from said open end.

10. The flange clamp with an automatic fail safe of claim 7 wherein:
said first and second clamp halves include a V-shaped cross section.

11. The flange clamp with an automatic fail safe of claim 7 wherein:
a pivot flange is formed on said one end of said first clamp half, a pivot yoke is formed on said one end of said second clamp half to receive a thickness of said pivot flange.

12. The flange clamp with an automatic fail safe of claim 7 wherein:
a lever yoke is formed on said opposing end of said second clamp half.

13. A flange clamp with an automatic fail safe comprising:
a first clamp half having one end and an opposing end, said first clamp half having a substantially semi-circular shape, a hook opening is located on said opposing end;
a second clamp half having one end and an opposing end, said second clamp half having a substantially semi-circular shape, said one end of said first clamp half being pivotally attached to said one end of said second clamp half;
a lock lever having one end pivotally retained by said opposing end of said second clamp half;
a hook member includes a hook rod and a pivot block, said hook rod includes a hook portion and a threaded shaft, said threaded shaft is threadably retained in said pivot block, said pivot block is pivotally retained by said lock lever; and
a quick release pin includes a retention pin and a spring, a lengthwise axis of said retention pin is slidably retained on said second clamp half in a locked position and an unlocked position, said retention pin is biased into said locked orientation with said spring, said lengthwise axis is substantially parallel to a side wall of said second clamp half, wherein said first and second clamp halves are capable of being secured to flanges of two adjacent pipes, said hook portion is inserted into said hook opening, a distal end of said lock lever is retained by said retention pin of said quick release pull pin in said locked orientation when closed.

14. The flange clamp with an automatic fail safe of claim 13 wherein:

said lock lever includes a U-shape, said U-shape includes an open end.

15. The flange clamp with an automatic fail safe of claim 14 wherein:

two angled legs extend from said open end.

16. The flange clamp with an automatic fail safe of claim 13 wherein:

said first and second clamp halves include a V-shaped cross section.

17. The flange clamp with an automatic fail safe of claim 13 wherein:

a pivot flange is formed on said one end of said first clamp half, a pivot yoke is formed on said one end of said second clamp half to receive a thickness of said pivot flange.

18. The flange clamp with an automatic fail safe of claim 13 wherein:

a lever yoke is formed on said opposing end of said second clamp half.

\* \* \* \* \*